United States Patent

[11] 3,608,836

[72] Inventors Leonard S. Bryant
  Wadsworth;
  Harley D. Hickenbotham, Barberton, both of Ohio
[21] Appl. No. 815,459
[22] Filed Apr. 11, 1969
[45] Patented Sept. 28, 1971
[73] Assignee PPG INdustries, Inc.
  Pittsburgh, Pa.

[54] PROCESS OF RECLAIMING OFFGRADE TITANIUM DIOXIDE
  12 Claims, 1 Drawing Fig.
[52] U.S. Cl. .................................................. 241/16,
  106/300, 106/308 B, 106/308 N, 241/24
[51] Int. Cl. ........................................................ B02c 23/06,
  C09c 1/36
[50] Field of Search .......................................... 106/300;
  241/16, 22, 24

[56] References Cited
  UNITED STATES PATENTS

| | | | |
|---|---|---|---|
| 2,260,871 | 10/1941 | Sawyer .......................... | 106/300 X |
| 2,591,988 | 4/1952 | Willcox ......................... | 106/300 X |
| 2,628,919 | 2/1953 | Tanner et al. ................. | 106/300 X |
| 2,744,029 | 5/1956 | Kingsbury .................... | 106/300 |
| 2,933,408 | 4/1960 | Dempster ..................... | 106/300 |
| 3,460,957 | 8/1969 | Giovanetti et al. ........... | 106/300 |
| 3,492,264 | 1/1970 | Hahn ............................ | 106/309 X |

Primary Examiner—Tobias E. Levow
Assistant Examiner—H. M. S. Sneed
Attorney—Chisholm and Spencer ABSTRACT: Offgrade titanium dioxide produced by vapor phase reaction of titanium halide is reclaimed to yield pigmentary titanium dioxide that can be blended with production grades of titanium dioxide pigment. Reclamation includes the steps of wet milling waste titanium dioxide under nonpeptizing conditions, and hydroclassification of the milled slurry.

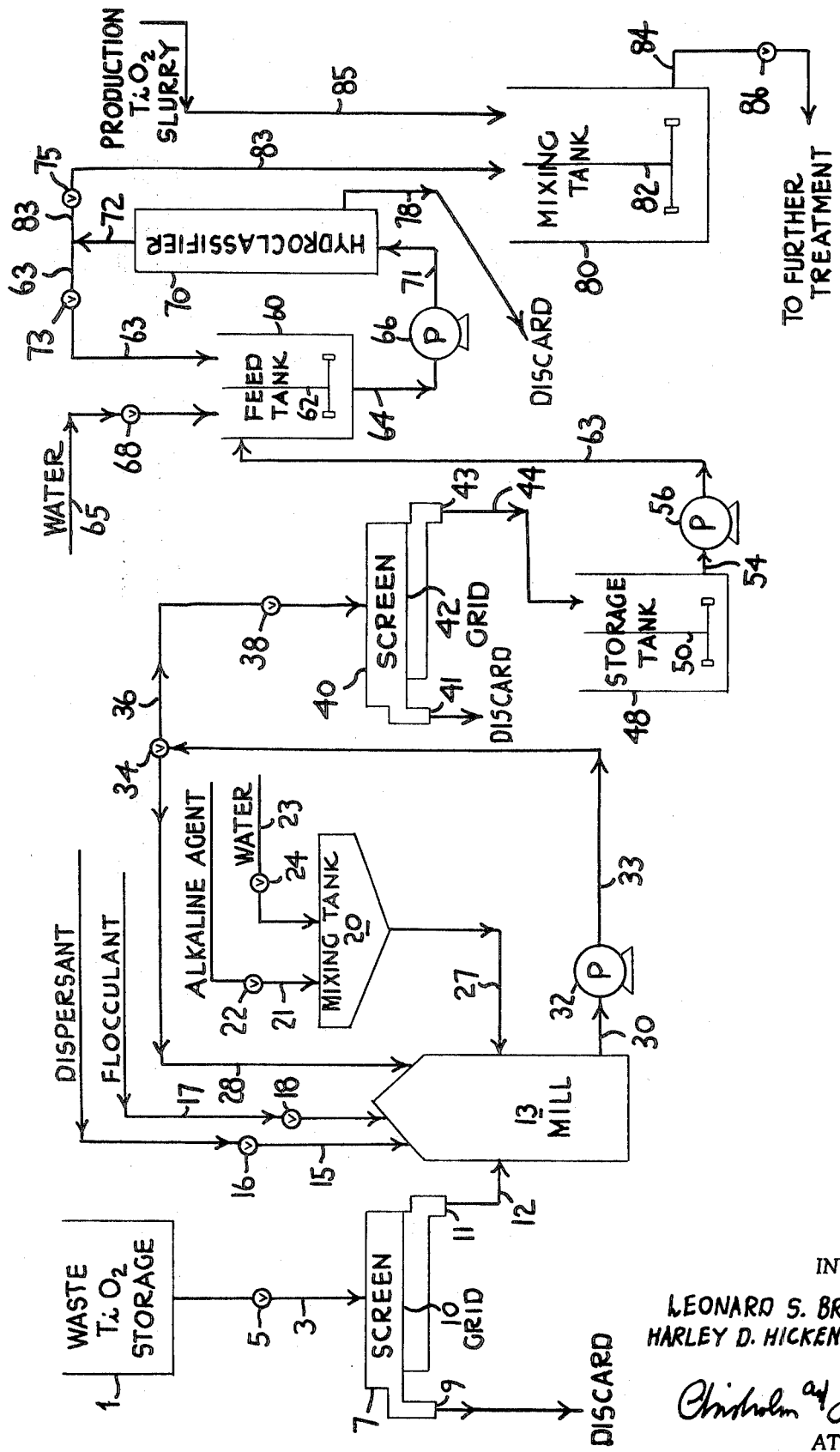

PROCESS OF RECLAIMING OFFGRADE TITANIUM DIOXIDE

BACKGROUND OF THE INVENTION

During the production of pigmentary titanium dioxide by vapor phase reaction of titanium halide, offgrade or waste titanium dioxide is produced. Waste titanium dioxide is typically composed of large aggregates of pigmentary titanium dioxide, deposits of titanium dioxide removed from the walls of the reaction vessel, accretions of titanium dioxide on inert particles used in fluid bed reactors, sintered aggregates of titanium dioxide, etc. The amount of waste titanium dioxide produced by the process can vary from as little as 0.5 percent to as much as 40 percent of the total production of pigmentary titanium dioxide.

Offgrade titanium dioxide typically has a lower tinting strength and browner tone than pigmentary titanium dioxide that meets normal production specifications. Accordingly, the former is separated from the latter prior to processing pigment to a finished or marketable product. Such separation is performed for the reason that incorporation of waste titanium dioxide into pigmentary titanium dioxide of good quality degrades the latter's performance to a level below that required in most coating applications, e.g., paints, which application represents a major use for pigmentary titanium dioxide. Typically, the waste titanium dioxide either is left behind in the reaction vessel when the gaseous suspension of pigmentary titanium dioxide is removed from the reactor or is physically separated from the pigmentary titanium dioxide subsequent to its removal from the reactor. Regardless of when or how the waste titanium dioxide is formed or separated from the pigmentary titanium dioxide produced, recovery and treatment of waste titanium dioxide to yield salable pigment is important to the economics of the process.

It has been proposed to recover titanium dioxide remaining on the particles of a fluid bed reactor by milling the particles comprising the fluid bed. See, for example, U.S. Pat. No. 3,287,087. However, this procedure is limited to the treatment of soft aggregates of pigmentary titanium dioxide. It has also been proposed to reclaim waste titanium dioxide by screening an aqueous alkaline slurry of said titanium dioxide followed by wet milling the fines from the screening step to obtain a milled product wherein the largest particle is less than 10 microns. See, for example, French Pat. 1,470,899. This latter procedure has not been entirely successful due to peptization of the pigment which results in blockage of pigment transfer lines and low levels of recovery, e.g., about 50 percent. Thus, a need for an improved process for reclaiming waste titanium dioxide as a salable commodity remains.

SUMMARY OF THE INVENTION

It has now been discovered that a substantial portion of offgrade titanium dioxide produced by vapor phase reaction of titanium halide can be reclaimed by first milling an aqueous alkaline slurry of waste titanium dioxide in the presence of a depeptizing amount of flocculating agent and then hydroclassifying the milled slurry to remove about 50 percent of particles greater than about 13 microns. The product thereby produced can be blended with quality pigment.

BRIEF DESCRIPTION OF THE DRAWING

The accompanying drawing is a diagrammatic flowsheet of a preferred embodiment of the present process wherein a sequence of dry screening, wet milling, wet screening and hydroclassification of waste titanium dioxide is shown.

DETAILED DESCRIPTION

One of the principal methods for producing pigmentary titanium dioxide is by vapor phase reaction of at least one titanium halide, e.g., a titanium trihalide or tetrahalide. Typically, this method comprises reacting vaporous titanium halide, e.g., titanium tri- or tetra-chloride, bromide and/or iodide, and oxygen and/or water vapor in a reaction zone at elevated temperatures. For the oxidation reaction, reaction temperatures usually range between about 800° C. and about 1,200° C. Hydrolysis reaction temperatures typically range from 300° C. to 400° C. The aforementioned vapor phase oxidation process is suitably described in U.S. Pat. Nos. 3,068,113 and 3,214,284, which are incorporated herein, in toto, by reference.

Pigmentary titanium dioxide prepared by vapor phase reaction of titanium halides is removed from the reaction vessel as a gaseous suspension. The suspension is cooled and the pigment separated from the gaseous phase and subjected to further processing, such as degassing, hydroclassification, hydrous metal oxide coating, fluid energy milling, etc. Offgrade titanium dioxide is also produced by this process. The percentage of offgrade titanium dioxide produced varies with the particular type of reactor used. It can represent as little as 0.5 percent or as much as 40 percent of the total production. The latter amount can result from the use of fluid bed reactors.

Offgrade titanium dioxide has a lower tinting strength than that of the pigmentary quality product, e.g., approximately 1,000–1,200, as compared to about 1,600, a browner tone, e.g., about Brown −2 to Brown −4, as compared to neutral or Blue −1, and is composed of agglomerates of ultimate particles and ultimate particles that exhibit a particle size greater than the optimum of from about 0.2 to about 0.3 micron. Its chemical composition is, however, similar to that of titanium dioxide of pigmentary quality, i.e., at least 90 weight percent $TiO_2$ and from 0.1 to about 10 weight percent of other metal oxides, such as the oxides of silicon, aluminum, potassium, zirconium, zinc, boron, beryllium and thorium. It is not suitable for use in paint formulations with critical specifications because the large agglomerates do not disperse sufficiently during incorporation of the pigment into paint vehicles. Such poor dispersion results in a gritty paint film and a paint film having poor hiding power. The large ultimates do not efficiently reflect visible light spectra, resulting in poor hiding power when incorporated into paint films.

A portion of the waste or offgrade titanium dioxide produced remains in the reactor as wall deposits, precipitated aggregates, sintered aggregates or accretions on fluid bed particles. The remainder is separated from the pigmentary product after the latter's removal from the reactor. The manner of formation of the offgrade titanium dioxide or the manner of its separation from pigmentary titanium dioxide is not critical to the process of the present invention. As used herein, the term "waste" or "offgrade" titanium dioxide is intended to mean and include titanium dioxide that does not substantially satisfy product specifications set at the beginning of a production run. Thus, regardless of the pigment grade being produced, e.g., enamel grade, latex grade, plastics grade, etc., a certain percentage of the total production run will be off specification material that is unsuitable for the intended end use. Typically, the offgrade material from other than a fluid bed reactor will be composed substantially of the above-described wall deposits, precipitated aggregates and sintered aggregates. A typical Tyler wet screen analysis for offgrade titanium dioxide of the aforementioned materials is as follows:

| Tyler Mesh Screen | Weight Percent of Sample |
| --- | --- |
| +4 (dry screened) | 16 |
| +20 | 20 |
| +35 | 8 |
| +60 | 6 |
| −60 | 50 |

Such "offgrade" material typically will have the optical and chemical properties described above and is separated from pigmentary titanium dioxide before the application of hydrous metal oxide coatings thereto when such coatings are employed. "Pigmentary titanium dioxide" or "production grade" titanium dioxide is intended to mean and include reactor discharge pigment of acceptable quality, i.e., a pigment that meets or substantially satisfies the production specifications or requirements set at the beginning of the production run.

It has now been found that a substantial proportion, e.g., about 75–80 percent, of waste titanium dioxide produced by vapor phase reaction of titanium halide can be reclaimed by a combination of milling and hydroclassification steps. In a preferred embodiment, dry- and wet-screening steps are also incorporated into the process. The former before milling and the latter after milling.

Turning now to the drawing, there is shown a preferred technique for reclaiming waste titanium dioxide which comprises the sequential steps of dry-screening, wet-milling, wet screening and hydroclassification.

In the drawing, numeral 1 represents a waste titanium dioxide storage bin. This bin is utilized principally when the process described herein is operated as a batch process; however, it can also be used when the process is operated as a continuous process in conjunction with the main pigment production facility. Bin 1 is connected to screen 7 by line 3. The flow of dry waste titanium dioxide from bin 1 to screen 7 is regulated by valve 5. Screen 7 is equipped with grid 10 which has openings that conveniently can vary from one-half inch to 2 inches. The coarse fraction from screen 7 is discarded through exit 9. The fines from screen 7 are removed through exit 11 by line 12 which is connected directly to mill 13. As the fines from screen 7 enter mill 13, they are wetted by an alkaline solution of water which enters the mill through line 27. Conveniently, the water and alkaline agent are premixed (as shown) in mixing tank 20; however, they can be introduced into the mill separately. Water and alkaline agent are introduced into mixing tank 20 from sources not shown through lines 23 and 21 respectively. The quantity of water and alkaline agent entering tank 20 are controlled by valves 24 and 22 respectively. Dispersant and flocculant are added to mill 13 through lines 15 and 17 respectively. Control of the amount of dispersant and flocculant entering mill 13 from sources not shown is effected by valves 16 and 18 respectively. The milled slurry of waste titanium dioxide is removed from the mill by line 30 and pumped to screen 40 by means of pump 32, line 33 and line 36. Control of the amount of slurry from mill 13 entering screen 40 is controlled by both T-valve 34 and valve 38. The left-hand arm of T-valve 34 is connected to line 28 which recycles milled slurry to mill 13.

Material retained on grid 42 of screen 40 is removed through exit 41. The fines passing through screen 40 are removed through exit 43 and line 44 which leads to storage tank 48 which is equipped with agitator 50. Waste titanium dioxide is removed from tank 48 through line 54 and pumped to feed tank 60 by means of pump 56 and line 63. Water is introduced into feedtank 60 from a source not shown through line 65 and valve 68 to dilute the milled slurry of waste titanium dioxide before subjecting it to hydrocyclonic separation. Tank 60 is equipped with agitator 62 to ensure a homogeneous dilution. The diluted slurry is removed from tank 60 through line 64 and pumped by pump 66 and line 71 to hydroclassifier 70. Although only one unit is shown, hydroclassification can be performed in two, three, or more stages. A blowdown from the hydroclassifier is taken through line 78 and the hydroclassified slurry leaves the unit through line 72. The hydroclassified slurry, if desired, can be split into two streams. One stream is directed back to feed tank 60 through line 63 and valve 73 while the other is directed into mixing tank 80 through line 83 and valve 75. The amount of the split will be determined by the amount of hydroclassified slurry desired in mixing tank 80.

Reclaimed waste titanium dioxide is mixed in tank 80 by agitator 82 with production grade titanium dioxide which is introduced through line 85. Typically, the regular production $TiO_2$ stream is cooled, neutralized, reactor discharged and is introduced as a slurry; however, it can also be introduced dry into mixing tank 80. In such event, additional water, alkaline agent and dispersant would also be added to tank 80 from sources not shown. The homogeneous mixture of reclaimed titanium dioxide and production grade pigmentary titanium dioxide is removed from mixing tank 80 through line 84 and valve 86 for further regular processing, e.g., hydroclassification, coating with hydrous metal oxides, drying, fluid energy milling and packing. Although the reclaimed waste titanium dioxide does not require a further hydroclassification, it is convenient to admix it with a slurry of the regular production product before the latter is subjected to hydrocyclonic separation.

Screen 7 can be any suitable screening device, such as a Sweco vibrating screen, or can be replaced by suitable dry- or wet-classifying equipment, such as cyclones, centrifuges, etc. Grid 10 of the screen can have openings of from about one-half to about 2 inches. Typically, the screen will have about a 1-inch grid. This dry-screening removes, as a coarse fraction, large titanium dioxide aggregates and large sintered pieces of pigment that cannot be reclaimed as blendable material and thereby preclassifies the waste titanium dioxide before milling.

Screen 7 can be eliminated, if desired, from the preferred process for the reason that its principal function is to remove unreclaimable material at the beginning of the process rather than have such material traverse the entire process and be removed by the hydroclassifier. Thus, although the coarse fraction from screen 7 can be easily milled by mill 13, substantially all of this fraction is rejected by the hydroclassifier. Moreover, by initially eliminating this coarse fraction, which is very abrasive, the life of downstream equipment, such as the hydroclassifier, is prolonged.

Mill 13 can be any suitable fine-grinding mill, such as a vibrating mill, e.g. a Sweco Vibro-Energy mill, a sand mill, disc mill, ball mill and pebble mill. A description of various suitable grinding mills and grinding media can be found on pages 1,130–1,160 of the *Chemical Engineer's Handbook*, John H. Perry, Editor, McGraw-Hill Book Company, Inc., 3rd Edition (1950). That description is incorporated herein, in toto, by reference. The mill should be capable of mechanically attriting aggregates of offgrade pigment so that substantially all of the milled pigment passes a Tyler 20-mesh screen (about 833 microns). Preferably, the mill grinds the pigment so that substantially all of the milled pigment passes a Tyler 100-mesh screen (about 147 microns), more preferably, a Tyler 200-mesh screen (about 74 microns). Further, both the mill and grinding medium should be fabricated of nonerosive or noncorrosive materials so that contaminants from these sources do not degrade the color of the pigment being milled. Typically, the grinding media will be cylinders or spheres having a mean diameter of from about one-eighth inch to 3 inches, usually one-fourth inch to 1 inch, and will be fabricated from fused alumina, silica, stainless steel, ceramic, porcelain, flint, etc. The mill will usually be fabricated of stainless steel lined with polyurethane, porcelain or flint.

Due to residual halogen or hydrogen halide on the surface of the waste titanium dioxide, e.g., chlorine or hydrogen chloride, an aqueous slurry of such material will typically have a pH of less than 5. Therefore, to avoid the need for acid-resistant construction of the mill and to assist in its dispersion, an alkaline agent is usually added to the slurry to make the slurry alkaline. However, if the mill is constructed of acid-resistant materials, no alkaline agent is required. The amount of alkaline agent added to the slurry will depend, to a large extent, on the acidity of the slurry and the viscosity desired for milling. Typically, the adjusted pH of the slurry will vary between about 7.5 and about 12 and have a viscosity of between about 100 and 2,500 centipoises measured at 70° F. The particular slurry viscosity utilized will depend to a large extent upon the particular mill and grinding material used. For example, if low-density porcelain or flint pebbles are employed in the mill, efficient slurry viscosities, i.e., viscosities that provide good milling efficiency, range between about 500 and about 1,100 centipoises. For high density porcelain or steel balls, a viscosity of between about 1,700 and about 2,300 centipoises is desirable.

The solids concentration of the slurry within the mill also depends to a large extent on the particular mill employed. Generally, a high solids concentration favors efficient milling; however, solids concentration of from 10 to 60 percent can be used.

The water used to form the slurry in mill 13 should be such so as not to incorporate harmful contaminants into the pigment, i.e., the water should be relatively pure, e.g., deionized or distilled water.

Any alkaline agent conventionally utilized to adjust the pH of a titanium dioxide pigment slurry can be used. Typical of the alkaline agents that can be used, alone or in any combination, include sodium hydroxide, potassium hydroxide, lithium hydroxide, ammonium hydroxide, calcium hydroxide, magnesium hydroxide, barium carbonate, potassium carbonate, sodium carbonate, potassium bicarbonate, sodium bicarbonate, and gaseous ammonia. Particularly suitable is sodium hydroxide.

As shown in the drawing, the water and alkaline agent are conveniently added to the mill together to avoid any localized acidic conditions within the mill. However, simultaneous separate additions of water and alkaline agent can be used. If the mill is acid resistant, the water and alkaline agent need not be added simultaneously.

Dispersants, or deflocculating agents as they are often called, are added to the aqueous waste pigment slurry to aid hydroclassification of the slurry. Such dispersants conveniently are added to the process at the milling stage as shown in the accompanying FIGURE; however, they can be added to any other convenient stage in the system prior to hydroclassification. Typically, between about 0.01 and about 0.5 weight percent dispersant, preferably between about 0.1 and about 0.3 weight percent, based on the amount of waste pigment, is used.

Examples of suitable dispersants include primary amines, such as ethylene diamine or ethylamine, secondary amines, such as diethanolamine or diethylenetriamine, tertiary amines, such as pyridine or triethylamine, and quaternary ammonium hydroxides, such as benzyltrimethyl ammonium hydroxide; water soluble phosphates, particularly the alkali metal phosphates, such as hydrous or anhydrous sodium ammonium phosphate, sodium hypophosphate, sodium hypophosphite, sodium monophosphate, sodium diphosphate, sodium tribasic phosphate, sodium metaphosphate, sodium pyrophosphate, sodium phosphate (pyrodisodium), sodium orthophosphate, sodium hexametaphosphate, sodium tripolyphosphate, as well as the same or similar soluble phosphates of potassium, ammonium and lithium, particularly, the tripolyphosphates, hexametaphosphates and tetraphosphates; sodium silicate, sodium hydroxide, ammonium hydroxide and sodium carbonate. The type of dispersant utilized is not critical and any suitable dispersant conventionally used in the pigment industry can be employed.

It has been found that dispersed slurries of waste titanium dioxide peptize. Dispersed slurries typically occur when the slurry is alkaline, i.e., at a pH greater than 7; more typically at a pH of from about 9 to 10. As a consequence, and despite constant agitation of the slurry, the pigment settles out from the slurry as a dense compact deposit which tends to plug the process equipment, e.g., transfer lines, exit openings, pumps, etc. It has been discovered that peptization of such slurries of waste pigment can be avoided by introducing to the slurry a depeptizing amount of a flocculant such as magnesium sulfate. Since it is desirable to maintain the slurry in a dispersed condition to avoid reagglomeration of the milled waste pigment, care should be observed to add to the slurry only an amount of flocculant which prevents peptization of the slurry, i.e., a depeptizing amount. Typically, from about 0.01 to about 3 weight percent flocculant, based on waste titanium dioxide, is used; however, more or less can be used depending on the characteristics of the particular slurry.

Any suitable flocculating agent can be added to the mill slurry in a depeptizing amount. The use of flocculants in the pigment industry is well established and any of those disclosed materials can be used. Particularly suitable are the metallic salts of polyvalent metals having a water solubility in the range of from about 0.0003 gram equivalent of metallic ion to about 0.5 gram equivalent of metallic ion per liter of water. Examples of such polyvalent metals include aluminum, barium, bismuth, cadmium, calcium, chromium, cobalt, copper, iron, lead, magnesium, manganese, mercury, nickel, strontium, tin, vanadium and zinc. Typical salts of the aforesaid metals include body inorganic and organic salts such as the sulfates, carbonates, sulfites, chlorides, bromides, bromates, ferrocyanides, thiosulfates, iodides, fluorides, formates, acetates, benzoates, oxalates, tartrates, malonates, succinates, cinnamates and metaborates. See, for example, U.S. Pat. No. 2,260,871. Other examples of flocculating agents include the barium and sodium salts of sulfonated aromatic petroleum. See, for example, U.S. Pat. No. 2,220.952. Of particular utility are the sulfates, carbonates, chlorides, formates and acetates of magnesium, barium, aluminum and calcium.

Retention time in the mill will depend to an extent on the condition of the waste titanium dioxide introduced to the mill. Generally, milling is conducted for a period of time sufficient to reduce the particle size of the waste titanium dioxide so that at least 90 weight percent of the milled slurry passes through a Tyler 20-mesh screen. Preferably, attrition is sufficient to cause at least 90 weight percent of the milled pigment to pass a Tyler 100-mesh screen, more preferably a Tyler 200-mesh screen. Such milled pigment will stay in aqueous suspension with only nominal agitation. Retention time in the mill can vary from 5 minutes to about 36 hours. Usually, milling times vary from about 30 minutes to about 3 hours. The slurry is typically milled at ambient temperatures, although higher or lower temperatures can be utilized if convenient for the particular process. Pressures are usually atmospheric.

Although not illustrated in the drawing, various automatic controls can be associated with the mill. For example, an automatic pH control of the mill slurry can be obtained by utilizing an in-line pH meter, e.g., in-line 33, that operates an automatic valve in alkaline agent feedline 21. Similarly, slurry level within the mill can be controlled by the use of a high/low level immersed electrode within the mill that either opens or shuts a control valve (not shown) in line 28. In addition, slurry gravity within the mill can be controlled by the use of a gravity controller which would operate a valve on water feedline 23 to tank 20. All of the aforementioned control devices can be used for either batch or continuous operation.

After milling, the slurry of waste titanium dioxide, if desired, is passed to a second screen provided with a sieve size of at least a Tyler 20-mesh screen to remove particles in excess of 833 microns. As previously indicated, preferably screen 40 is equipped with at least a 100 and more preferably, a 200-mesh screen to remove particles in excess of 147 and 74 microns respectively. The coarse fraction from the second screen is discarded while the fines are diluted with water to reduce the viscosity of the slurry for hydroclassification. Any suitable screening device can be employed such as, for example, a vibrating or oscillating screen. The size of the screening device will depend upon the amount of slurry processed. A description of various suitable screening apparatus can be found on pages 955–964 of the above-recited Chemical Engineer's Handbook. That description is incorporated herein, in toto, by reference.

The principal function of screen 40 is to remove nonreclaimable waste titanium dioxide from the milled slurry before hydroclassification so that the useful life of the hydroclassifier is prolonged. The amount of such material will depend on the amount of sintered aggregate and ultimate particles fed to screen 40 which are larger than the openings of grid 42 and, to a certain extent, on the period of milling. Generally, the longer the milling time, the greater the extent of size reduction. In a continuous process, however, a small portion of the material passing through the mill will have a retention time of substantially zero. Therefore, the utility of screen 40 is more pronounced in a continuous process for reclaiming waste $TiO_2$ than in a batch process. Since milling times in a batch process can be extensive, e.g., 24 to 36 hours, the coarse fraction rejected by screen 40 through even a Tyler 100-mesh screen may be insufficient to justify the economics of acquiring, installing, and operating the screen. Thus, since screen 40 serves to reduce the workload on the downstream hydroclassifier, it, like dry screen 7, can be eliminated from the preferred process scheme.

The milled, and preferably milled and screened, aqueous slurry of waste titanium dioxide is then diluted with water to reduce its viscosity for hydroclassification. Typically, the slurry's viscosity will be from about 10 to 25 centipoises, measured at 70° F., for hydroclassification. The exact viscosity used will depend to a large degree on the hydrocyclone unit used and the manufacturer's recommendations.

Hydrocyclonic separation of the milled slurry can be performed in one or more stages. Typically, three stages are used to obtain a distinct separation of blendable material from nonblendable material. A sufficient number of stages should be used to obtain a blendable, reclaimed offgrade titanium dioxide product which will have a primary fineness of grind, as measured by the Hegman gage, of at least 7 and, preferably, at least 7½. Expressed differently, hydrocyclonic separation is sufficient to remove about 50 percent of particles having a mean diameter larger than about 13 microns, preferably about 7 microns. Any type of conventional hydroclassifier, e.g., a Dorrclone, that will make the above-recited separation can be used in the process described herein.

The reclaimed offgrade titanium dioxide, i.e., the overflow cut from the last stage of the hydroclassifier, can then be blended with regular production grades of pigmentary titanium dioxide. Blending can be accomplished in any convenient manner and can be performed on a dry or wet basis. The amount of reclaimed titanium dioxide blended with production grades will depend on the particular grade produced; but, typically will range from 1 to 10 weight percent, usually from 6 to 10 weight percent. The less critical the end use specifications, the greater the percentage of reclaimed material that can be used. Alternatively, reclaimed titanium dioxide can be utilized by itself in such product areas as paper and ceramics.

Fineness of grind of a pigment can be determined by A.S.T.M. Method: D-121054. The tinting strength and tone of a pigment can be determined by A.S.T.M. Method: D-332-26. Both methods are found in the *Book of A.S.T.M. Standards*, published by the American Society for Testing and Materials, Philadelphia 3, Pennsylvania. The tint efficiency of a pigment can be determined by the reflectometry method described in A.S.T.M. Method: D-2745-68T. This method was originally described by Mitton and Jacobsen in the Journal of Paint Technology and Engineering, (Official Digest, Vol. 34, pp. 704-715, July, 1962).

The present process is more particularly described in the following examples which are intended as illustrative only since numerous modifications and variations therein will be apparent to those skilled in the art.

EXAMPLE I

About 1,560 pounds of waste titanium dioxide containing about 4 weight percent alumina and from about 0.5 to 0.7 weight percent silica were introduced to a makeup tank containing deionized water and equipped with an agitator. All of the waste titanium dioxide was −4 Tyler mesh material and had a screen analysis similar to that described earlier herein. The pH of the slurry was adjusted from about 4.5 to about 8.3 with a 10 percent sodium hydroxide solution and the slurry made up to about 40 percent solids. Attempts to pump the slurry to a 20-mesh Sweco vibrating screen were hindered substantially due to the plugging of the discharge line of the makeup tank with titanium dioxide that had settled.

EXAMPLE II

The slurry of example I was passed through a Tyler 20-mesh screen and into a holding tank. About 0.2 weight percent of sodium hexametaphosphate was added to the slurry and the material fed to a Sweco Vibro-Energy mill at a rate of about two-thirds gallon per minute. Retention time in the mill was about 30 minutes. During operation, the feedline to the mill and the mill discharge line would plug up and then temporarily open causing wide variation in the feed rate. The milled slurry was then pumped to a mixing tank where it was diluted to 20 percent solids and the resulting slurry hydroclassified through a one-stage Dorrclone. The cyclones within the Dorrclone were plagued with constant plugging. Examination of the hold tank, Sweco Vibro-Energy mill and the lines leading to and from the hold tank and mill were examined and found to contain a heavy layer of sludge or grit.

The overflow from the Dorrclone was analyzed for fines and found to have a primary fineness of grind (Hegman fines) of 7½. Although the procedure of this example resulted in recovering a portion of the 1,560-pound waste titanium dioxide fed to the slurry makeup tank in example I, the process encountered line-plugging difficulties and recovered only about 64 percent of the initial charge.

EXAMPLE III

Waste titanium dioxide was screened through a wire screen having 1-inch-square openings and mixed with deionized water in a Sweco Vibro-Energy mill until a slurry containing 30 percent solids was obtained. Simultaneously with the introduction of the preclassified waste titanium dioxide to the Sweco mill, 0.2 weight percent, based on the waste titanium dioxide, of sodium hexametaphosphate and sodium hydroxide, as a 10 percent solution, was fed to the mill. Sufficient sodium hydroxide was introduced to the mill to maintain the pH of the mill discharge at about 9.5. After milling for about 30 minutes, the milled slurry was fed to a 200-mesh Sweco vibrating screen. The fines from the 200-mesh Sweco screen were discharged into an air-agitated surge tank. This operation was continued for about 3 hours before a shutdown was caused by plugging in the mill discharge line. Examination of the mill discharge piping and surge tank revealed a peptized layer of −200-mesh material in both the piping and surge tank bottom.

EXAMPLE IV

The procedure of example III was repeated except that no sodium hexametaphosphate or sodium hydroxide solutions were added to the mill. The pH of the mill discharge averaged about 4.5. Examination of the discharge piping and surge tank revealed that no peptizing occurred; however, the acidic nature of the slurry would require acid-resistant construction in the mill, screens and hydroclassifier.

EXAMPLE V

RUN 1

In accordance with the processing sequence depicted in the FIG., waste titanium dioxide was preclassified (dry) with a screen containing a 1-inch grid and fed to a Sweco Vibro-Energy mill. Simultaneously with the addition of the waste titanium dioxide to the mill, deionized water, sodium hydroxide, sodium hexametaphosphate (0.1 weight percent) and magnesium sulfate (0.5 weight percent) were added to the mill. The mill slurry was regulated at 30 percent solids. Sufficient sodium hydroxide (10 percent solution) was added to the slurry to maintain the mill discharge pH at about 9.5. Retention time in the mill was about 3½ hours. Following milling, the slurry was pumped to a 200-mesh Sweco vibrating screen. The −200-mesh product was transferred to a surge tank equipped with an agitator where it was diluted. This material was hydroclassified in three stages with Dorrclones. The fineness of grind (Hegman fines) of the overflow from the third stage was 7½+.

RUN 2

The procedure of run 1 was repeated except that the solids concentration in the mill was regulated at about 40 percent. The fineness of grind (Hegman fine) of the overflow from the third stage Dorrclone was also 7½+.

Paints prepared from the hydroclassified (reclaimed) titanium dioxide alone exhibited a tinting strength and tone of 1,440 and Brown −1 respectively, and a tint efficiency of about 86 percent in a polyvinyl acetate vehicle extended with clay at a pigment volume concentration of 60 percent.

EXAMPLE VI

The procedure of run 1, example V, was operated continuously for 72 hours with no operation problems. Greater than 99 percent of the waste material fed to the mill was ground to a −200-mesh material and then hydroclassified to yield a product with a 7½ Hegman fines. No line plugging or grit buildup in the mill or discharge piping were experienced. Typically, the +200-mesh material represented less than 0.5 weight percent of the material fed to the 1-inch grid screen.

The hydroclassified material was blended in with production pigmentary titanium dioxide, and the resulting mixture hydroclassified, given a hydrous metal oxide coating of silica, alumina and Titania and fluid energy milled. Paints prepared from both the production titanium dioxide and production titanium dioxide containing about 6 percent reclaimed pigment both had tinting strengths of about 1,700, tones of Blue −2 and tint efficiencies of about 102 percent in a polyvinyl acetate vehicle extended with clay at a pigment volume concentration of 60 percent.

While there are above described a number of specific embodiments of the present invention, it is obviously possible to produce other embodiments and various equivalent modifications thereof without departing from the spirit of the invention.

Having set forth the general nature and specific embodiments of the present invention, its scope is now particularly pointed out in the appended claims.

We claim:

1. In the process of milling a dispersing agent containing aqueous alkaline slurry of dispersed offgrade titanium dioxide produced by vapor phase reaction of titanium halide, the improvement which comprises milling said slurry in the presence of a depeptizing amount of flocculating agent.

2. A process according to claim 1 wherein from about 0.01 to about 3 weight percent of flocculating agent, based on offgrade titanium dioxide, is used.

3. A process according to claim 2 wherein the flocculating agent is magnesium sulfate.

4. A process for reclaiming offgrade titanium dioxide prepared by vapor phase reaction of titanium halide, which comprised (a) milling an alkaline, dispersing agent containing aqueous slurry of said titanium dioxide in the presence of a depeptizing amount of flocculating agent for a time sufficient to produce a milled product, at least 90 weight percent of which passes through a Tyler 20-mesh screen, and (b) then hydroclassifying the milled slurry to obtain a product having a Hegman fineness of grind of at least 7.

5. A process according to claim 4 wherein the offgrade titanium dioxide is preclassified before milling to remove unreclaimable material that fails to pass through a screen having openings of from one-half to 2 inches.

6. A process according to claim 4 wherein the milled slurry is wet classified to remove material that fails to pass through a Tyler 20-mesh screen before said slurry is hydroclassified.

7. A process according to claim 4 wherein the milled slurry is wet classified to remove material that fails to pass through a Tyler 200-mesh screen before said slurry is hydroclassified.

8. A process according to claim 4 wherein from 0.01 to about 3 weight percent of flocculating agent is used.

9. A process according to claim 4 wherein the flocculating agent is magnesium sulfate.

10. A process according to claim 4 wherein milling is performed for from 5 minutes to 36 hours.

11. A process according to claim 4 wherein the Hegman fineness of grind of the hydroclassified slurry is 7½+.

12. A process for reclaiming offgrade titanium dioxide prepared by vapor phase reaction of titanium halide, which comprised (a) dry screening said offgrade titanium dioxide to remove unreclaimable material having a mean diameter greater than from about one-half inch to about 2 inches, (b) milling an aqueous, dispersing agent containing alkaline slurry of said screened titanium dioxide in the presence of from about 0.01 to about 3 weight percent of magnesium sulfate for from 5 minutes to 36 hours, (c) wet screening said milled slurry through a screen having a sieve size of at least a Tyler 100-mesh screen, and (d) hydroclassifying said wet-screened slurry to obtain a product having a Hegman fineness of grind of at least 7.